July 25, 1967  J. T. DENNIS  3,332,689
AUTOMATIC RECORD CHANGER TONE ARM CONTROL
Original Filed Jan. 15, 1954  8 Sheets-Sheet 1
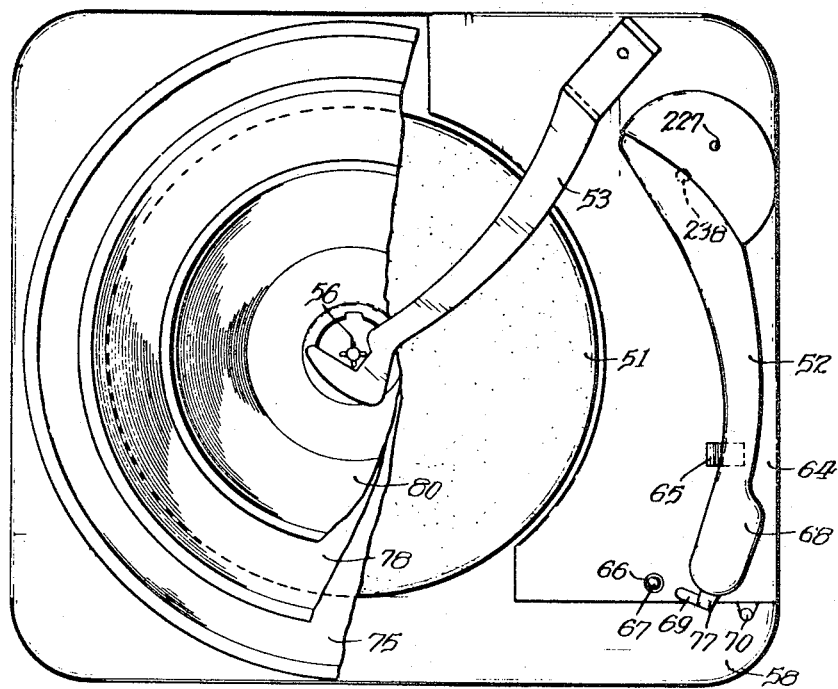
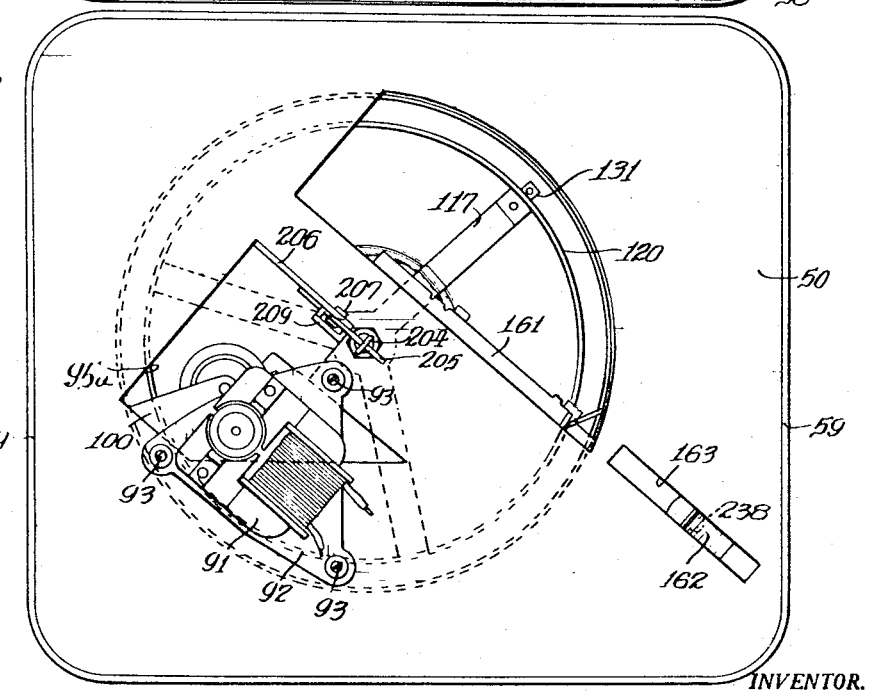
INVENTOR.
James T. Dennis
BY
Mason, Kolehmainen, Rathburn and Wyss
Attys INVENTOR.
James T. Dennis
BY
Mason, Kolehmainen, Rathburn and Wyss.
Attys July 25, 1967          J. T. DENNIS          3,332,689
AUTOMATIC RECORD CHANGER TONE ARM CONTROL
Original Filed Jan. 15, 1954          8 Sheets-Sheet 3
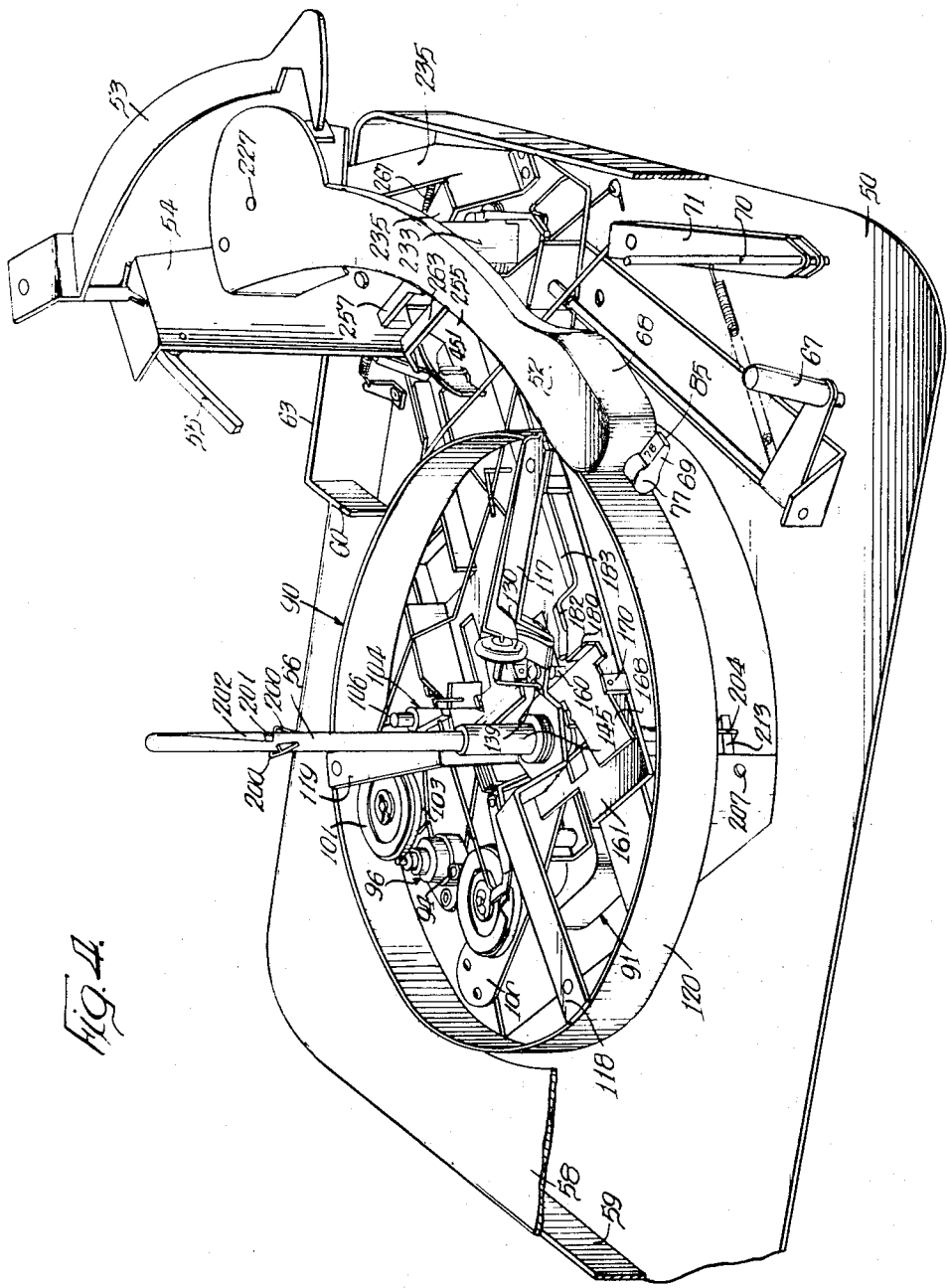
INVENTOR.
*James T. Dennis*
BY
*Mason, Kolehmainen, Rathburn and Wyss.*

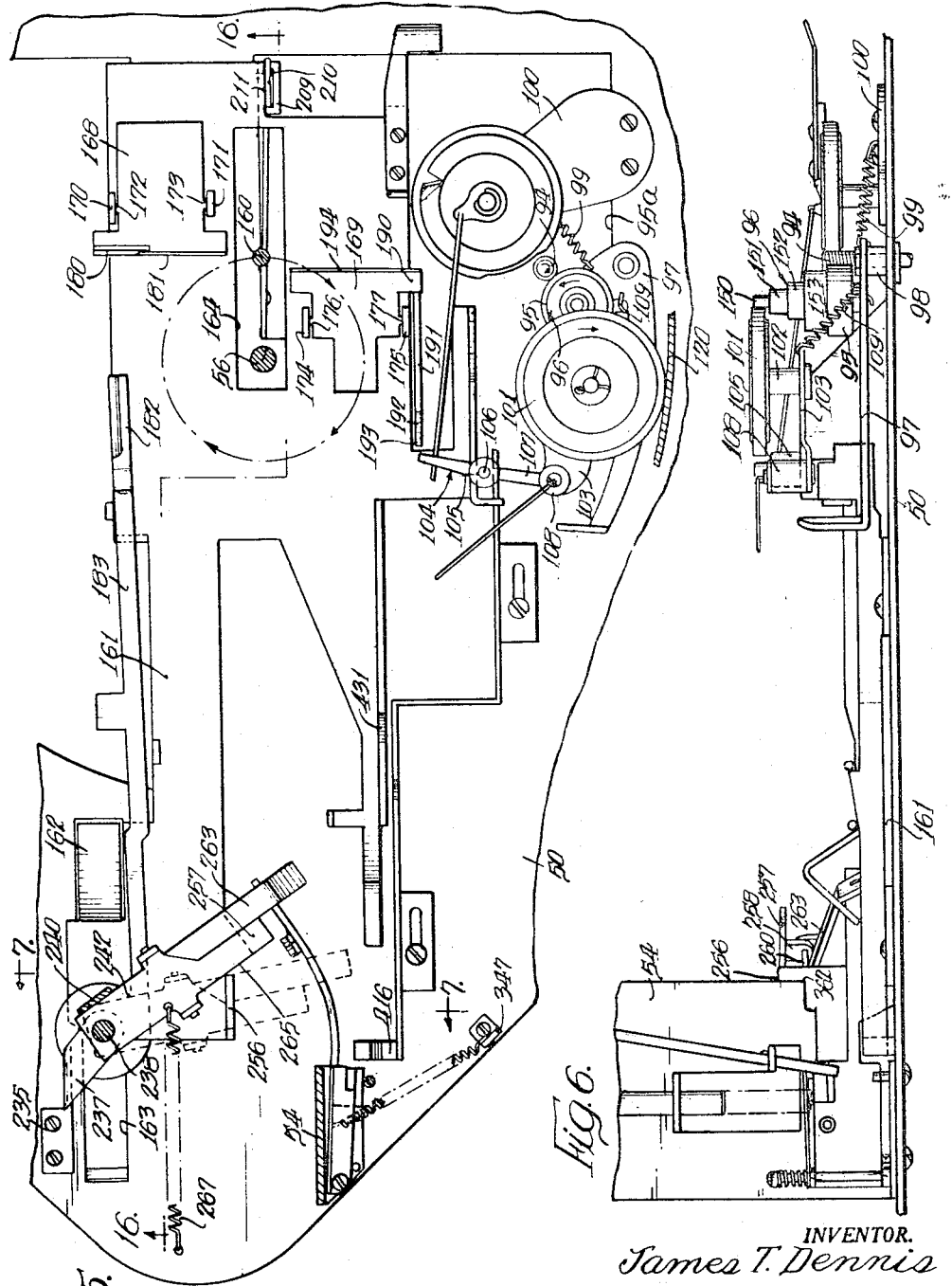

July 25, 1967          J. T. DENNIS          3,332,689
AUTOMATIC RECORD CHANGER TONE ARM CONTROL
Original Filed Jan. 15, 1954          8 Sheets-Sheet 5
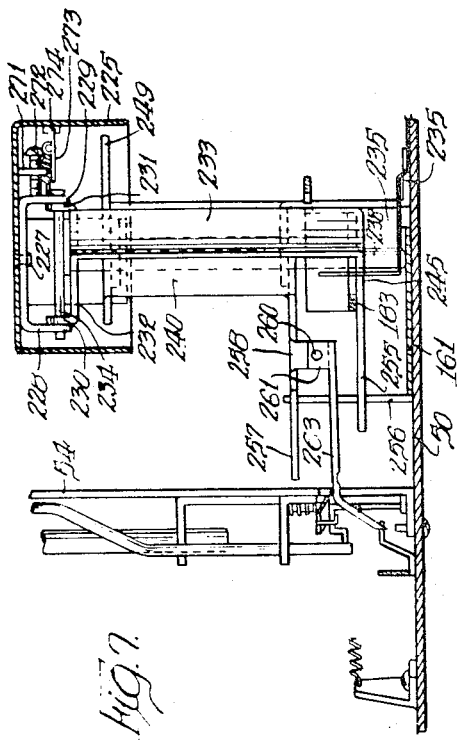
INVENTOR.
James T. Dennis
BY
Mason, Kolehmainen, Rathburn and Wyss.
Attys.

July 25, 1967 J. T. DENNIS 3,332,689
AUTOMATIC RECORD CHANGER TONE ARM CONTROL
Original Filed Jan. 15, 1954 8 Sheets-Sheet 6
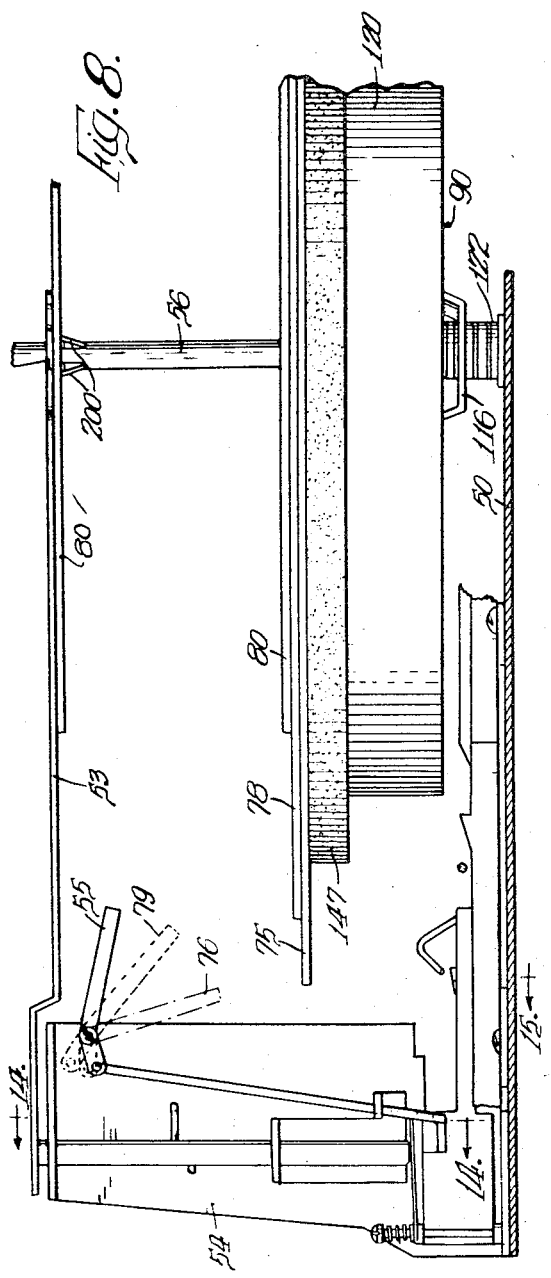
INVENTOR.
James T. Dennis
BY
Mason, Kolehmainen, Rathburn and Wyss.
Attys.

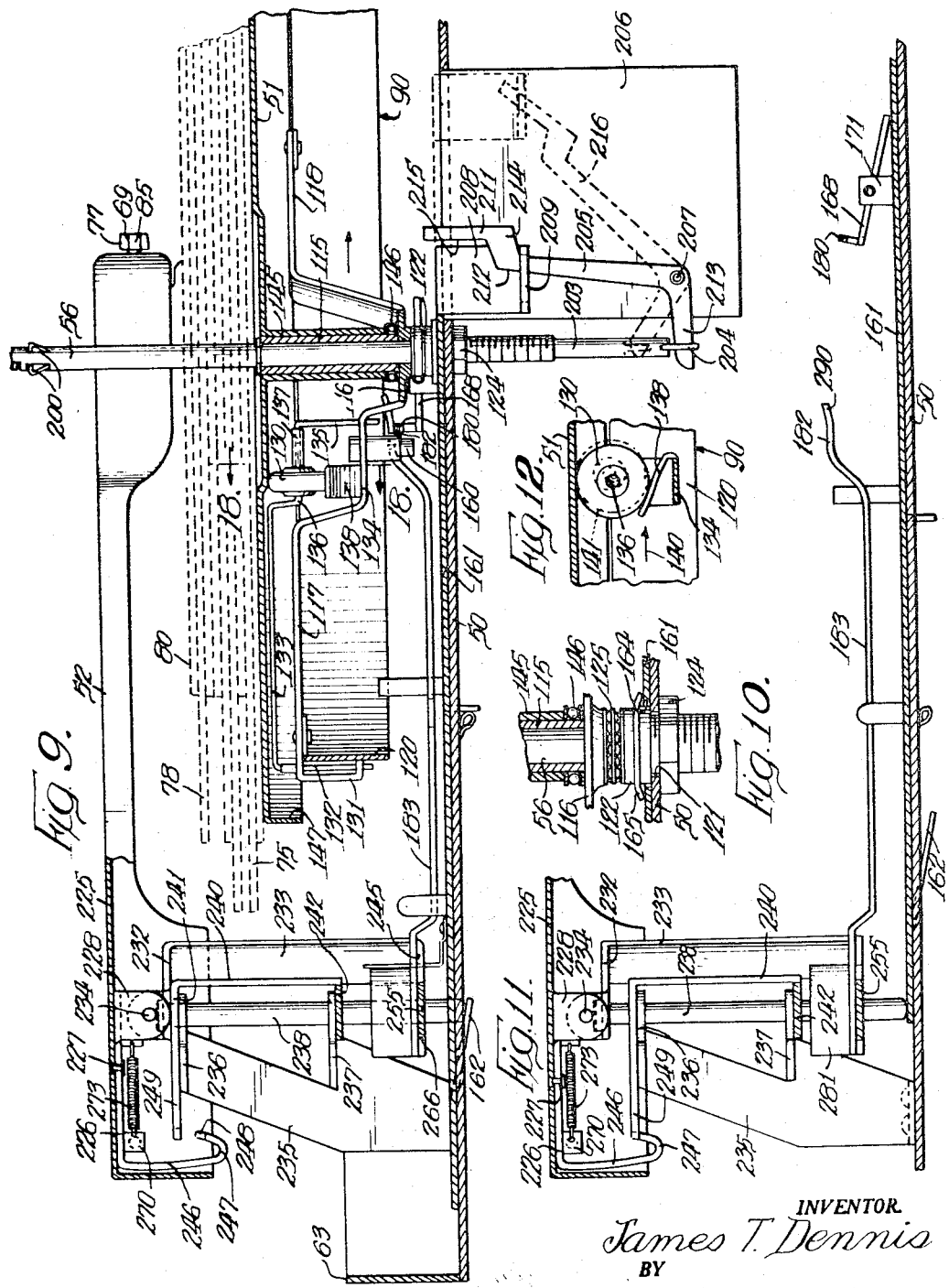

July 25, 1967  J. T. DENNIS  3,332,689
AUTOMATIC RECORD CHANGER TONE ARM CONTROL
Original Filed Jan. 15, 1954  8 Sheets-Sheet 8
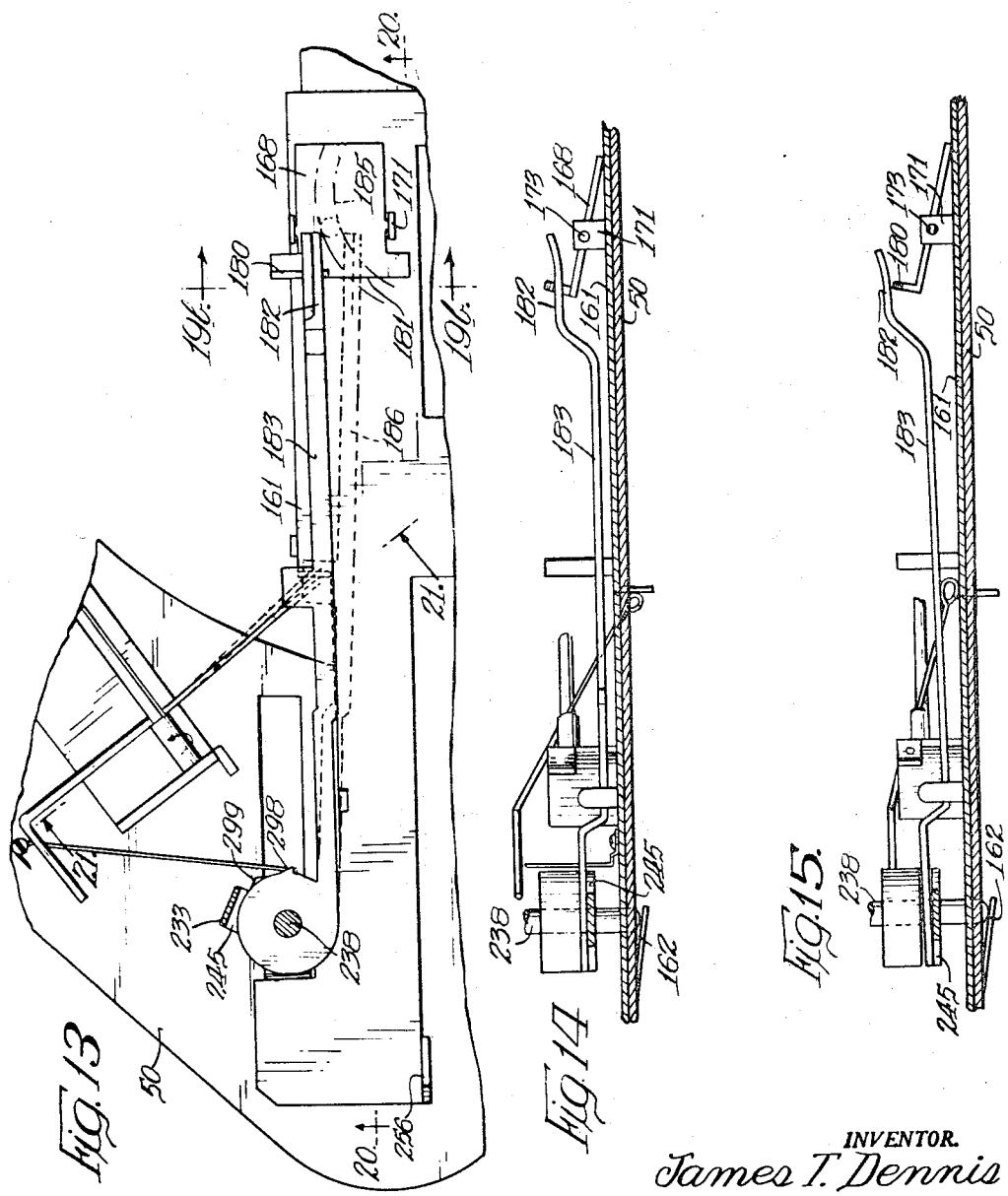
INVENTOR.
James T. Dennis
BY
Mason, Kolehmainen, Rathburn and Wyss.
Attys:

United States Patent Office 3,332,689
Patented July 25, 1967

3,332,689
AUTOMATIC RECORD CHANGER TONE
ARM CONTROL
James T. Dennis, 812 American National Bldg.,
Oklahoma City, Okla. 73102
Application Aug. 19, 1960, Ser. No. 50,768, now Patent
No. 3,232,624, which is a division of application Ser.
No. 404,191, Jan. 15, 1954, now Patent No. 2,956,830.
Divided and this application Jan. 4, 1966, Ser. No.
518,567
6 Claims. (Cl. 274—10)

The present invention is a division of my copending application Ser. No. 50,768, filed Aug. 19, 1960, now Patent No. 3,232,624, which is itself a division of parent application Ser. No. 404,191, filed Jan. 15, 1954, now Patent No. 2,956,830.

The present invention relates to automatic phonograph apparatus, and, more particularly, to a new and improved automatic record changer for phonograph apparatus.

In conventional automatic record changers, the tone arm mounting is so arranged that the tone arm is not released until the end of the record changing cycle even though the tone arm is positioned on the record a substantial period before the record changing cycle ends. In such changers, if a large stack of records is positioned on the turntable, the tone arm is held over the lead-in groove of the uppermost record until the record changing cycle is completed and is prevented from moving inwardly as the stylus engages the record groove so that the stylus is twisted and the needle may become damaged thereby. Furthermore, the spring tension which is built up when the tone arm is held and the stylus is twisted, in many instances causes the tone arm to jump several grooves of the record when the tone arm is released at the end of the record changing cycle.

Accordingly, it is an object of the present invention to provide a new and improved record changer having a tone arm mounting arrangement in which the tone arm is released substantially immediately after the needle engages the phonograph record and independently of the number of records positioned on the turntable.

It is a further object of the present invention to provide a new and improved record changer having a tone arm mounting arrangement in which the tone arm is permitted to follow the record grooves immediately after the needle engages the record and independently of the end of the record changing cycle.

It is a still further object of the present invention to provide a new and improved tone arm mounting arrangement for an automatic record changer which may be economically manufactured and may be assembled with a minimum number of operations.

The invention, both as to its organization and method of operation, together with further objects and advantages thereof, will best be understood by reference to the following specification taken in connection with the accompanying drawings, in which:

FIG. 1 is a top plan view of an automatic record changer embodying the features of the present invention;

FIG. 2 is a bottom view of the record changer of FIG. 1;

FIG. 4 is a perspective view of the record changer of FIG. 1 shown with the turntable removed and the base plate of the changer partially exposed;

FIG. 5 is a fragmentary plan view of the record changer of FIG. 1, partly in section, and showing the cycling slide in substantially the mid-point of the changing cycle;

FIG. 6 is a fragmentary side elevational view of the portion of the record changer shown in FIG. 5;

FIG. 7 is a fragmentary side elevational view taken along the line 7—7 of FIG. 5;

FIG. 8 is a fragmentary side elevational view of the record changer of FIG. 3 taken along the line 12—12 thereof and with the turntable added;

FIG. 9 is a sectional view taken along the lines 16—16 of FIG. 5;

FIG. 10 is a sectional view on a larger scale of the turntable and drive wheel mounting arrangement shown in FIG. 9;

FIG. 11 is a sectional side elevational view similar to FIG. 9 and showing the cycling slide in a different position;

FIG. 12 is a sectional view taken along the lines 18—18 of FIG. 9;

FIG. 13 is a fragmentary plan view of a portion of the record changer of FIG. 1 showing the operation of the trip arm and the delay mechanism therefor;

FIG. 14 is a side elevational view taken along the line 20—20 of FIG. 13;

FIG. 15 is a sectional side elevational view similar to FIG. 14 and showing the tripping mechanism in a different position.

Figure 3:
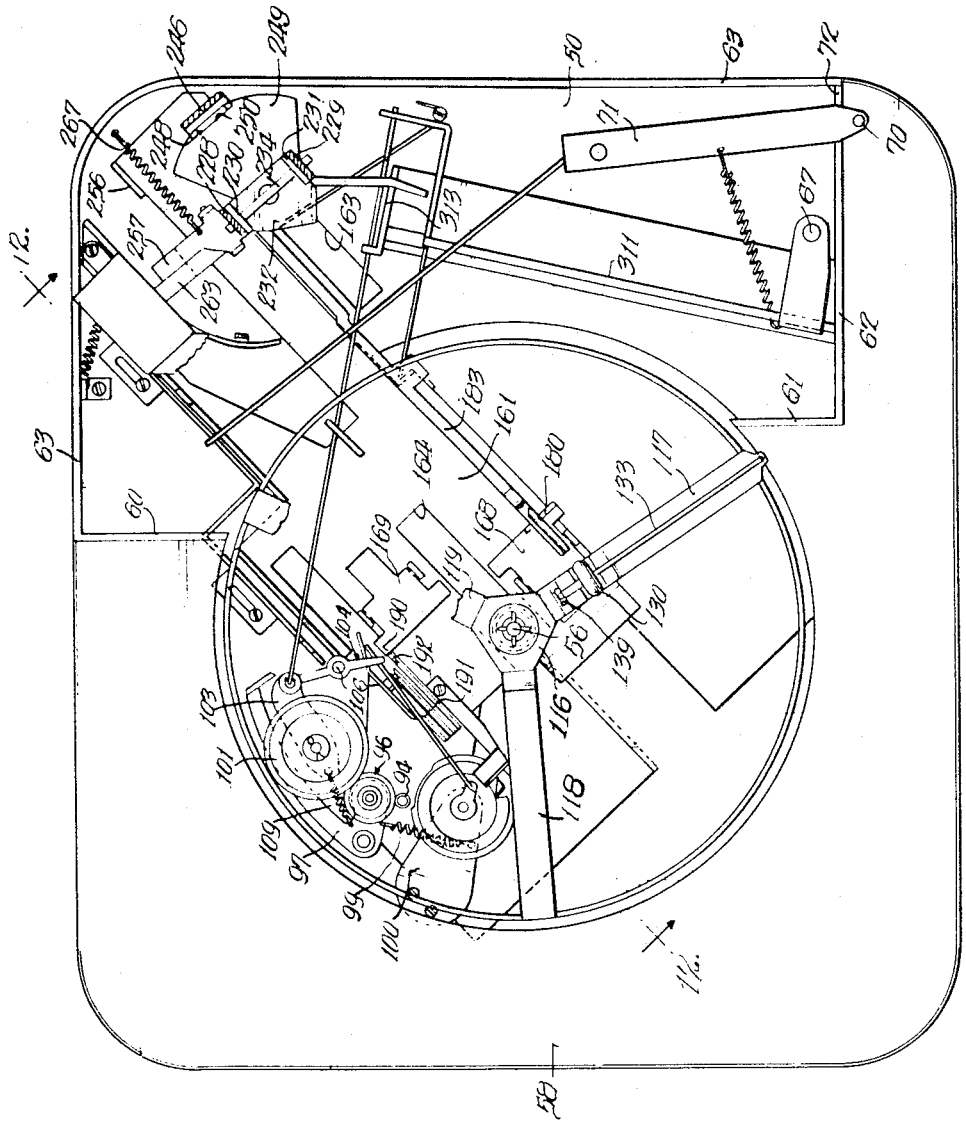
FIG. 3 is a top view of the record changer of FIG. 1 on a somewhat larger scale and shown with the turntable, tone arm and cover plate removed.

Referring now to the drawings, and more particularly to FIGS. 1 to 15, inclusive, thereof, the record changer of the present invention is therein illustrated as comprising a base member, indicated generally at 50, which supports the component parts of the record changer including a rotatable turntable 51, a tone arm 52, and a record hold-down arm 53, the arm 53 being mounted on a supporting member 54 which latter member also houses a size indexing finger 55. A centering spindle 56 is also supported on the base plate 50 and carries a stack of records in non-playing position which may be individually released to the turntable 51 during successive record changing cycles as will be described in more detail hereinafter. In the illustrated embodiment, the base plate 50 is enclosed by a cover member which includes the top plate 58 and sides 59, a raised portion including the side members 60, 61, 62 and 63, and the removable cover plate 64 being provided so that the components which are positioned on the base plate 50 are substantially completely enclosed. The cover plate 64 carries a tone arm rest post 65 on which the tone arm 52 is adapted to be positioned during non-playing intervals. The cover plate 64 is also provided with an opening 66 through which extends a depressible operate button 67, the button 67 comprising the sole operating control of the record changer. The tone arm 52 is provided with a head portion 68 within which is positioned a conventional two position cartridge (not shown) provided with a rotatable needle selecting arm 69 which projects from the front end of the tone arm 52 and may be adjusted manually to select needles of two different sizes, i.e., one mil and three mil needles, in accordance with the groove size of the records which are to be played. When the needle selecting arm 69 is in the position shown in FIG. 1 a one mil needle, which is suitable for playing 33⅓ r.p.m. and 45 r.p.m. records is positioned to engage the grooves of a record on the turntable 51, whereas when the needle selecting arm 69 is in the position shown in FIG. 4, a three mil needle which is suitable for playing 78 r.p.m. records is positioned to engage the grooves of a record on the turntable 51. In this connection it will be understood that suitable indicia are conventionally provided on the opposite sides of the needle selecting arm 69 so as to inform the operator which size of needle is positioned to engage the record. A vertically extending 78 r.p.m. speed indexing rod 70 is supported on the end of a bracket 71 which projects through an opening 72 in the side member 62 and extends upwardly to a point adjacent the needle selecting arm 69 when this arm is in the 78 r.p.m. needle selecting position.

Briefly, to consider the general mode of operation of the record changer described thus far, it is pointed out that the record changer of the present invention is adapted to play seven inch 45 r.p.m. records and ten inch and twelve inch 33⅓ r.p.m. records completely automatically and in intermixed sequence without any adaptation of the records themselves, other than the provision of suitable adaptors for the spindle 56. Also, the record changer is adapted to play seven inch, ten inch and twelve inch 78 r.p.m. records completely automatically and in intermixed sequence without any adaptation of the records themselves and without any modification or adjustment of the machine other than the normal adjustment of the needle selecting arm 69 to the 78 r.p.m. needle position. Considering first the situation wherein a group of 33⅓ r.p.m. and 45 r.p.m. records are to be played in intermixed sequence, and assuming that the needle selecting arm 69 is in the corresponding needle position shown in FIG. 1, these records are positioned on the spindle 56 and the hold-down arm is positioned over the topmost record, after which the operator merely depresses the button 67 to initiate a completely automatic playing period during which the above mentioned sizes and speeds of records are played in intermixed sequence without further attention on the part of the operator.

When the button 67 is depressed the turntable 51 starts to rotate and the bottommost record of the stack supported on the spindle 56 is dropped to the turntable 51 after which the tone arm 52 is moved to the correct position over the edge of the record and lowered into engagement with the lead-in groove of the record. Assuming that a twelve inch 33⅓ r.p.m. record 75 (FIG. 1) is dropped to the turntable 51, as this record falls it strikes the size indexing arm 55 and moves it downwardly to the position shown in dotted lines at 76 in FIG. 12 with the result that the tone arm 52 is positioned in the run-in groove of the twelve inch record. At the end of the record changing cycle, the speed of the turntable 51 is automatically adjusted to 33⅓ r.p.m. by means to be described in more detail hereinafter so that the twelve inch 33⅓ r.p.m. record 75 is played at the correct speed. When the tone arm 52 reaches the run-out groove of the record 75 a new record changing cycle is initiated, the tone arm 52 is lifted off of the record and moved outwardly beyond the edge of the record, after which the next record in the stack supported on the spindle 56 is dropped to the turntable 51. In moving outwardly during the record changing cycle the tone arm 52 is controlled so that the hub 77 of the needle selecting arm 69 does not strike the 78 r.p.m. speed indexing rod 70 in the extreme outward position of the tone arm 52.

Assuming that a ten inch 33⅓ r.p.m. record 78 is next dropped to the turntable 51, this record strikes the size indexing arm 55 in dropping to the turntable so that the arm 55 is moved to the position shown in dotted lines at 79 in FIG. 8 and the tone arm 52 is positioned in the run-in groove of the ten inch record 78. At the end of this record changing cycle, the speed of the turntable 51 is automatically adjusted to 33⅓ r.p.m. so that the record 78 is played at the correct playing speed. When the tone arm 52 has again moved into the run-out groove of the record 78, the next record changing cycle is initiated and the tone arm 52 is removed from the path of the record in the manner described above and the next record is dropped to the turntable, the tone arm 52 again being controlled so that the rod 70 is not moved thereby.

Assuming that a seven inch 45 r.p.m. record 80 is next dropped to the turntable 51, the size indexing arm 55 is not struck by this record and the tone arm 52 is controlled accordingly so that it is positioned in the run-in groove of the seven inch record 80. At the end of this record changing cycle, the speed of the turntable 51 is automatically adjusted to 45 r.p.m. so that the record 80 is played at the correct playing speed. The above described automatic speed change operation is effected on the basis of record size. When the needle selecting arm 69 is in the 33⅓ and 45 r.p.m. position, seven inch records are to be played at 45 r.p.m. and ten and twelve inch records are to be played at 33⅓ r.p.m. Since 33⅓ r.p.m. seven inch records have, for all practical purposes, passed out of existence, and all 45 r.p.m. records now on the market are of the seven inch size, it will be evident that the above described arrangement functions automatically to play all present day 33⅓ r.p.m. and 45 r.p.m. records completely automatically and without requiring any speed adjustment on the part of the operator.

If the operator desires to play 78 r.p.m. records, a group of those records of different sizes may be placed on the spindle 56 and the needle selecting arm 69 is adjusted to the 78 r.p.m. needle position shown in FIG. 4. When the tone arm 52 is positioned on the rest 65 the needle selecting arm 69 is positioned adjacent to but not touching the upper end of the 78 r.p.m. speed indexing rod 70. When the operate button 67 is depressed a record changing cycle is initiated and the first 78 r.p.m. record is dropped to the turntable 51. At substantially the mid-point of this record changing cycle, the tone arm 52 is moved outwardly beyond the rest position shown in FIG. 1 so that the end 85 of the needle selecting arm 69 strikes the upper end of the rod 70 and moves it outwardly. When the rod 70 is thus moved outwardly the record changing mechanism is controlled so that the speed of the turntable 51 is adjusted to 78 r.p.m. at substantially the end of the record changing cycle with the result that when the tone arm 52 is positioned in the run-in groove of the 78 r.p.m. record the turntable 51 is operating at the correct playing speed. In this connection it will be understood that the size indexing arm 55 functions in the manner described above to position the tone arm 52 in accordance with the size of the 78 r.p.m. records deposited on the turntable 51. Since the needle selecting arm 69 remains in the 78 r.p.m. needle position while all 78 r.p.m. records are played, it will be evident that the 78 r.p.m. speed indexing rod 70 is moved outwardly by the tone arm 52 during each record changing cycle so that the speed of the turntable 51 is automatically adjusted to 78 r.p.m. at the end of each record changing cycle.

If the operator now desires to play a stack of 33⅓ and 45 r.p.m. records he merely places these records in random sequence on the spindle 56 and turns the needle selecting arm 69 to the 33⅓ and 45 r.p.m. needle position and depresses the operate button 67 after which the record changer plays the 33⅓ r.p.m. and 45 r.p.m. records completely automatically in the manner described above with proper adjustment of the speed being automatically made for each record. As mentioned before, when the needle selecting arm 69 is in the 33⅓ and 45 r.p.m. needle position the hub 77 does not engage the rod 70 in the extreme outward position of the tone arm 52 so that the arm 70 is not moved when 33⅓ r.p.m. and 45 r.p.m. records are played. It will, therefore, be evident that the record changer of the present invention distinguishes between 78 r.p.m. records and microgroove records, i.e., 33⅓ r.p.m. and 45 r.p.m. records, on the basis of the size of the selected needle and further distinguishes between 33⅓ r.p.m. records and 45 r.p.m. records on the basis of record size so that all records may be played completely automatically and without any separate speed adjustments on the part of the operator. It will also be noted that the record changer of the present invention is so constructed and arranged that the operator is immediately informed by the pitch of the reproduced sound if the wrong needle size has been selected for a given record. Thus, if the needle selecting arm 69 is inadvertently left in the 78 r.p.m. needle position and either a 33⅓ r.p.m.

or a 45 r.p.m. record is played, the control rod 70 is moved in the manner described above so as to control the record changing mechanism to shift the speed of the turntable 51 to 78 r.p.m. Accordingly, the microgroove record is played at approximately twice the normal playing speed thereof so that the operator is immediately informed by the abnormally high pitch of the reproduced sound that the wrong needle size has been selected and can change the needle to the correct size before the microgroove needle or record is damaged. On the other hand, if the needle selecting arm 69 is in the 33⅓ and 45 r.p.m. needle position and a 78 r.p.m. record is played, the speed of the turntable is automatically adjusted to either 33⅓ r.p.m. or 45 r.p.m., depending upon the size of the record, and the operator is immediately informed by the abnormally low pitch that the wrong needle size has been selected since the 78 r.p.m. record will be played at approximately one-half its normal playing speed. It will also be noted that the needle selecting arm 69 can only be in one of two positions so that even if the operator is blind-folded he has a 50—50 chance of playing the records correctly by merely putting them on the spindle 56 and depressing the button 67.

*Turntable drive mechanism*

Considering now in more detail the manner in which the turntable 51 is driven, it will be recalled from the preceding general description that the speed of the turntable 51 is changed in accordance with the playing speed of records deposited on the turntable 51. In order to provide a simplified machine, a single revolution cycling mechanism is provided which is driven at a speed of 16⅔ r.p.m. for one revolution during which the record change is completed. With this arrangement the record changing cycle is of constant duration regardless of the playing speed of the records. While it is possible to slow down the turntable from a playing speed of 33⅓ r.p.m. or 45 r.p.m. to a speed of 16⅔ r.p.m. for one revolution to perform the record changing operation and then speed up the turntable again, such an arrangement has the disadvantage that when the turntable is slowed down during the record changing cycle a considerable amount of brake energy must be provided, particularly if the turntable is heavily loaded, with the result that the wear on the turntable driving means is considerably increased. Furthermore, due to the mass of the turntable and records, the speed of the record changing operation is considerably increased over what it would be if the turntable were driven at a constant speed of 16⅔ r.p.m. for one revolution. When the turntable is driven at a speed of 78 r.p.m. during the playing cycle, it is virtually impossible with conventional driving arrangements to slow down the turntable to 16⅔ r.p.m. in one revolution with eight or ten records on the turntable.

In order to provide an arrangement wherein the mass of the turntable and records thereon has little effect on the wear or speed of the driving means while permitting a single revolution changing mechanism to be used, there is provided a low inertia drive wheel, indicated generally at 90, which is positioned concentrically with the spindle 56 and drives the turntable 51 in the playing direction through a suitable clutch mechanism while permitting the turntable 51 to coast freely when the drive wheel 90 is slowed down. The drive wheel 90 also drives the record changing mechanism and the speed of the drive wheel 90 is reduced to 16⅔ r.p.m. during the record changing cycle after which the speed of the drive wheel 90 is changed to the playing speed of the new record deposited on the turntable 51, and drives the turntable 51 in the playing direction at this playing speed.

In order to drive the drive wheel 90, there is provided a motor indicated generally at 91 (FIG. 2), which is positioned on a mounting bracket 92 which is resiliently mounted on the underside of the base plate 50 by means of the mounting screws 93, the shaft 94 of the motor 91 extending upwardly through an irregular opening 95a in the base plate 50. The upper end of the shaft 94 engages the largest diameter step 95 of a multi-step turret 96 which is rotatably mounted on one end of a bell crank lever 97. The bell crank lever 97 is pivotally supported from the base plate 50 on the post 98 secured thereto and a spring 99 is connected from one arm of the bell crank lever 97 to an intermediate point on a bracket 100 which is secured to the base plate 50 and extends into the opening 95a so that the bottom step 95 of the turret 96 is normally urged into engagement with the upper end of the drive shaft 94. An idler wheel 101 is rotatably mounted on a post 102 secured to one end of a lever 103 the other end of which is pivotally secured to one end of a bell crank lever indicated generally at 104. The bell crank lever 104 is provided with a hub portion 105 which is rotatably mounted on a post 106 secured to the base plate 50, and the arm 107 of the bell crank 104 is provided at the end thereof with an enlarged end portion 108 to which the lever 103 is pivotally secured. A spring 109 is connected from the free end of the lever 103 to a point on the bell crank lever 97 so that the idler wheel 101 is normally urged into engagement with one of the steps on the multi-step turret 96.

The drive wheel 90 is provided with a bearing sleeve 115 (FIG. 9) which is rotatably mounted on the spindle 56 and a hub plate 116 is secured to the bottom end of the sleeve 115 and terminates in the spokes 117, 118 and 119 which project radially outwardly from the hub plate 116 and support at the outer ends thereof a rim 120. The spindle 56 is supported within the opening 121 (FIG. 10) in the base plate 50 by means of a threaded bushing 122 which is secured to the spindle 56 and is provided with a shoulder which cooperates with the nut 124 to clamp the spindle 56 securely to the base plate 50. A suitable ball bearing ring 125 is provided between the top of the bushing 122 and the hub plate 116 so that the drive wheel 90 may be freely rotated with respect to the spindle 56. The idler wheel 101 is adapted to engage the inner edge of the rim 120 when the record changer is operating so that the drive wheel 90 is driven from the turret 96 through the idler wheel 101 at a speed determined by the particular step of the turret 96 with which the idler wheel 101 is in engagement.

In order to drive the turntable 51 in the playing direction from the drive wheel 90, there is provided a rubber tired clutch wheel 130 which is secured to the spoke 117 of the drive wheel 90 and is adapted to engage the underside of the turntable 51. More particularly, the spoke 117 of the drive wheel 90 extends outwardly beyond the edge of the rim 120 to form a bracket 131 which pivotally supports the end 132 of a wire axle 133. The spoke 117 is provided with an intermediate step portion 134 which is provided with an aperture 139 (FIG. 4) adapted loosely to receive the end portion 135 of the wire axle 133 and the wheel 130 is positioned on a step portion 136 of the wire axle 133 and is held loosely in position by means of the tubular spacer 137. The step portion 134 of the spoke 117 is provided with an inclined flange portion 138 and the wire axle 133 is formed so that the wheel 130 is urged upwardly against the underside of the turntable 51.

When the drive wheel 90 is urged in the direction of the arrow 140 shown in FIG. 12 the clutch wheel 130 is wedged between the underside of the turnable 51 and the inclined surface of the flange 138 so that the drive wheel 90 and turntable 51 are directly locked together and rotate as an integral unit when the drive wheel 90 is driven in the playing direction. However, when the drive wheel 90 is slowed down to 16⅔ r.p.m. during the record changing cycle, the turntable 51 becomes disengaged from the drive wheel 90 since the relative movement between the drive wheel 90 and the turntable 51 is in the opposite direction from the arrow 140 with the result that the turntable 51 coasts freely since the wheel 130 remains in engagement with the underside of the turntable 51 and is moved out of engagement with the inclined surface of the flange 138 to the position shown in dotted lines at 141 in FIG. 12. In this connection it will be understood that while the clutch wheel 130 is normally wedged between the underside of the turntable 51 and the flange 138 when the drive wheel 90 is rotated in the playing direction, if excessive torque is produced between the drive wheel 90 and the turntable 51 the clutch wheel 130 will slip. Accordingly, if the record changer is turned off and the operator attempts to rotate the turntable 51 backwards, the clutch wheel 130 slips so that the drive wheel 90 is effectively disconnected therefrom and force jamming of the cycling mechanism is prevented. Also, in situations where the speed of the drive wheel 90 is abruptly increased during the changing cycle, the clutch wheel 130, will slip somewhat so that the turntable 51 is brought up to speed slowly and is not given too much momentum. This is particularly important in the event that the ultimate speed of the turntable 51 is slow so that overcoasting of the turntable 51 is prevented. It will also be noted that the turntable 51 is driven through the rubber tired clutch wheel 130 so that vibrations of the motor shaft are not transmitted directly to the turntable 51 to any substantial degree but must travel inwardly from the rim of the drive wheel, through the bearings of the drive wheel and turntable, and back out to the pick-up, with the result that "rumble" due to motor drive shaft vibrations tends to be reduced.

The turntable 51 is secured on the upper end of a bearing sleeve 145 which is rotatably mounted on the bearing sleeve 115 and rests on a ball bearing ring 146 which is positioned on the hub plate 116. In this connection it will be understood that while the turntable 51 has been illustrated as provided with a conventional rim 147, the rim 147 is actually unnecessary since the turntable 51 is driven from the drive wheel 90. Also, a relatively inexpensive bearing for the turntable 51 may be provided in place of the bearing sleeve 145 since the turntable is directly connected to and is driven by the drive wheel 90 when the turntable is rotated in the playing direction and the eccentricity of the turntable bearing does not affect reproduction. For example, the turntable may be provided with a pair of thin, annular portions which are positioned edgewise on the sleeve 115 at either end thereof to provide spaced bearing surfaces for the turntable. It will, therefore, be evident that the drive wheel 90 and the turntable 51 together are substantially equivalent, insofar as the weight of the metal and bearings are concerned, to a conventional single turntable.

Considering now the operation of the above described turntable drive mechanism, and assuming that the idler wheel 101 may be adjusted vertically by means to be described in more detail hereinafter, the motor drive shaft 94 continuously rotates the multi-step turret 96 by engagement with the lower step 95 thereof when the tone arm 52 is not positioned on the rest 65. If the idler wheel 101 is positioned to engage the topmost step 150 of the multi-step turret 96 as shown in FIGS. 5 and 6, the idler 101 is driven at the correct speed to rotate the drive wheel 90 at 16⅔ r.p.m. by engagement with the rim 120 thereof. If the idler 101 is positioned to engage the next step 151 on the turret 96 the idler wheel 101 is rotated at the correct speed to drive the drive wheel 90 at 33⅓ r.p.m. If the idler wheel 101 engages the third step 152 of the turret 96 the idler wheel 101 is driven at the correct speed to rotate the drive wheel 90 at a speed of 45 r.p.m. and if the idler 101 engages the step 153 of the turret 96 the drive wheel 90 is rotated at a speed of 78 r.p.m. It will be noted that the spring 109 (FIGS. 5 and 6) urges the idler wheel 101 into engagement with the turret 96 and the rim 120 in each of the above described positions so that driving connection to the drive wheel 90 is maintained.

*Drive mechanism for cycling slide*

As described generally heretofore in connection with the drive mechanism for the turntable 51, the drive wheel 90 also functions to drive the record changing mechanism directly. Furthermore, the record changing operation is completed during one revolution of the drive wheel 90 so that an extremely simple and economical record changing mechanism may be employed. More particularly, a connecting pin 160 (FIG. 9) is secured to the intermediate step portion 134 of the spoke 117 on the drive wheel 90 and extends downwardly therefrom. A cycling slide 161 is, in the illustrated embodiment, slidably positioned on the base plate 50 and is arranged to be reciprocated back and forth during one revolution of the connecting pin 160 secured to the drive wheel 90. The slide 161 is provided with an inclined portion 162 which extends downwardly through a slot 163 in the base plate 50 and the slide 161 is also provided with a slot 164 therein (FIG. 5) which is adapted to receive the bushing 122 (FIG. 10), a retaining plate 165 being secured to the bushing 122 with the edges thereof extending outwardly beyond the slot 164 so that the slide 161 is retained loosely on the base plate 50 and is guided by means of the slots 163 and 164.

In order to drive the cycling slide 161 from the connecting pin 160, a pair of cam riser plates 168 and 169 are tiltably mounted on the cycling slide 161. Thus, a first pair of upstanding ear portions 170 and 171 are struck up out of the slide 161 and are provided with suitable apertures for receiving the trunnion portions 172 and 173 of the cam riser 168. In a similar manner a pair of ear portions 174 and 175 are struck up out of the cycling slide 161 and are provided with suitable apertures for receiving the trunnion portions 176 and 177 of the cam riser 169. The cam riser 168 is provided with an upstanding flange 180 which extends along a portion of the edge 181 of the cam riser 168 and the cam riser 168 is normally held in a horizontal position by engagement of the free end 182 of a trip arm 183 with the top edge of the flange 180, as shown in FIG. 9. When the cam riser 168 is thus held in a horizontal position the connecting pin 160 does not strike the cam riser 168 but instead moves over the top of the riser 168 along the path indicated in dotted lines at 185 in FIG. 13.

When the trip arm 183 is either lifted upwardly as shown in FIG. 15 or moved to the side as indicated in dotted lines at 186 in FIG. 13, by means to be described in more detail hereinafter, the cam riser 168 tilts of its own weight to the position shown in FIGS. 14 and 15 so that the edge 181 of the cam riser 168 is brought up into the path of the connecting pin 160. Accordingly, on the next revolution of the connecting pin 160 this pin engages the edge 181 of the cam riser 168 and moves the cycling slide 161 forwardly toward the spindle 56, i.e., from the position shown in FIG. 3 to the position shown in FIG. 5. In this connection it will be understood that when the trip arm 183 is moved to the position shown in dotted lines at 186 in FIG. 13 the free end 182 thereof is moved beyond the flange 180 so as to permit the cam riser 168 to tilt to the position shown in FIG. 14.

The cam riser 169 is provided with a projecting ear portion 190 and the base plate 50 is provided with an upturned flange 191 having an inclined portion 192 at one end thereof. In the rest position of the slide 161 shown in FIG. 3, the ear portion 190 of the cam riser 169 rests on the step portion 193 of the flange 191 and the cam riser 169 is so pivoted that its own weight tends to hold the cam riser 169 horizontal with the ear 190 resting on the step 193. However, when the record changing cycle is initiated and the cycling slide 161 is moved forwardly by engagement of the connecting pin 160 with the cam riser 168, the ear 190 rides up the incline 192 on the flange 191 so that the edge 194 of the cam riser 169 is tilted upwardly into the path of the connecting pin 160.

As the connecting pin 160 continues to rotate during the second half of the record changing cycle, it strikes the edge 194 of the cam riser 169 and moves the cycling slide 161 back to its rest position. As the cam riser 169 is moved back to the rest position shown in FIG. 3 the ear 190 rides above the incline 192 so that as soon as the connecting pin 160 moves out of engagement with the edge 194 the cam riser 169 drops to the horizontal position so that it is not thereafter struck by the connecting pin 160 until the next record changing cycle. It will be noted that with the above described pivotal arrangement of the cam riser 169 the connecting pin 160 does not strike the edge 194 of the cam riser during the playing cycle so that an objectionable ticking sound is avoided. However, it will be understood that a fixed member may be provided on the slide 161 in place of the cam riser 169 which is adapted to be engaged by the connecting pin 160 during the last half of the record changing cycle, although such an arrangement, while simpler, suffers from the disadvantage that the connecting pin 160 may strike the edge of the fixed member on the slide 161 during each revolution while the records are being played. With the arrangement shown in FIGS. 1 to 15, inclusive, both of the cam risers 168 and 169 are tilted to a horizontal position so that no part of the cycling slide is engaged by the connecting pin 160 during the playing cycle. In this connection it will be noted that the cycling slide 161 is positively driven in both directions during the record changing cycle. Furthermore, power for the cycling slide 161 is applied to the rim of the drive wheel 90 at a speed of 16⅔ r.p.m. during the record changing cycle so that considerable power is available to actuate the record changing mechanism. It will also be understood that the drive wheel 90 may be of considerably smaller diameter and may, if desired, be driven by engagement of the idler wheel 101 with the outside of the rim of the drive wheel, it being necessary only to provide a drive wheel of sufficient diameter that the connecting pin 160 and a suitable turntable clutching mechanism thereon, such as the clutch wheel 130, satisfactorily perform the functions described above.

The centering spindle 56 is actuated by movement of the cycling slide 51 in timed relationship to movement of the tone arm 52 so as to release the bottommost record supported thereon onto the turntable 51 after the tone arm 52 has been moved beyond the diameter of the largest record. While the centering spindle 56 may comprise any suitable arrangement for supporting and releasing the record to the turntable 51, in the illustrated embodiment the spindle 56 is of the type shown and described in detail in my copending application, Ser. No. 319,975, filed Nov. 12, 1952 and reference may be had to this copending application for a detailed description of the spindle 56. However, for the purposes of the present invention, it may be stated that the spindle 56 (FIG. 4) is provided with four record supporting shoulders 200 which are spaced equally about the periphery of the spindle 56 and support a stack of records. The spindle 56 is provided with a record supporting shelf 201 and a control blade 202 is pivotally mounted in the upper end of the spindle and is adapted to move all but the bottommost record of the stack onto the shelf 201 during the record changing cycle. As soon as the upper records have been moved onto the shelf 201 the shoulders 200 are cammed inwardly so as to release the bottommost record onto the turntable 51.

The spindle 56 is provided with a tubular member 203 the upper end of which cams the shoulders 200 inwardly to release the bottom record and the control blade 202 is connected to the sleeve 203 (FIG. 9) by means of a control rod (not shown) so that the control blade 202 moves all but the bottom record onto the shelf 201 before the shoulders 200 are withdrawn. A U-shaped retaining loop 204 is secured to the bottom end of the sleeve 203 and the arm 213 of a bell crank lever 205 is positioned within the loop 204 and is adapted to engage the bottom end of the sleeve 203 when the ball crank 205 is pivoted. The base plate 50 is provided with a downwardly extending flange 206 to which the bell crank lever 205 is pivotally secured at 207. The cycling slide 161 is provided with a downwardly extending flange 208 which is provided with a right angle end portion 209 having an aperture 210 (FIG. 5) through which the upper end 211 of the bell crank lever 205 extends. As the flange 208 on the cycling slide 161 is moved away from the spindle 56 during the first half of the record changing cycle the back end of the slot 210 engages the edge 212 of the bell crank 205 and moves the end 213 of the bell crank 205 upwardly. However, the bell crank 205 is provided with an offset portion 214 so that a delay in the movement of the bell crank 205 is provided to give sufficient time for the tone arm 52 to be moved outside of the path of the released records. After this delay interval the back end of the slot 210 engages the upper edge 215 of the bell crank lever and continues to pivot the end 213 upwardly still further to the position shown in dotted lines at 216 in FIG. 9, in which position the shoulders 200 have been cammed inwardly to release the bottommost record to the turntable. On the return half of the record changing cycle the other end of the slot 210 engages the opposite edges of the upper end 211 of the bell crank 205, a similar delay being provided by the offset portion 214. It will be noted that the offset portion 214 of the bell crank 205 effectively provides a lost motion mechanism in a simple and economical manner so that the spindle 56 may be actuated in correct sequence with movement of the tone arm 52. In this connection it will be understood that any other suitable centering spindle which supports and releases the records from the spindle may be employed insofar as the other features of the present invention are concerned, it being understood further that the desired spindle may be actuated by any suitable bell crank arrangement which is driven from the cycling slide 161.

*Tone arm mounting mechanism*

Considering now in more detail the mechanism provided for mounting and moving the tone arm 52, it will be recalled from the general description that the tone arm is moved upwardly off the record at the start of the record changing cycle and is then moved outwardly beyond the path of the largest record. The tone arm 52 is thereafter moved inwardly to the correct position to engage the lead-in groove of the record which is released to the turntable 51 under the control of the size indexing finger 55 and its associated mechanism.

The tone arm 52 includes a hollow tone arm body 225 (FIG. 9) which may be of plastic or other suitable material, and is pivotally connected to a tone arm pivot bracket 226 by means of the pivot pin 227. The pivot bracket 226 is provided with a pair of downwardly extending ear portions 228 and 229 (FIG. 7) which are pivotally connected to a pair of upstanding ear portions 230 and 231, provided on the end flange 232 of a tone arm mounting bracket 233, by means of the hinge pin 234. A tone arm support bracket 235 is secured to the base plate 50 and is provided with a pair of spaced right angle portions 236 and 237 which are provided with aligned apertures for receiving a round elevating rod 238, the end of which rests on the inclined flange 162 of the cycling slide 161. A tone arm return bracket 240 is rotatably mounted on the elevating rod 238 by means of the end flanges 241 and 242 which are positioned outside of the right angle portions 236 and 237 on the support bracket 235. The tone arm mounting bracket 233 is likewise rotatably mounted on the rod 238 by means of the right angle end flange 232 and 245 which are provided with aligned apertures for receiving the rod 238, the upper end of the rod 238 engaging and supporting the hinge pin 234 at the center thereof.

The tone arm pivot bracket 226 is provided with a downwardly extending flange 246 which is provided with an upturned hook portion 247 terminating in an upwardly extending tongue portion 248 of less width than the hook portion 247. The end flange 241 of the tone arm return bracket 240 is provided with a fan-shaped extension 249 (FIG. 3) provided with a notch 250 in the periphery thereof. The tone arm mounting bracket 233 is provided with a transversely extending tone arm lever 255 (FIG. 7) which is formed integrally with the end flange 245 and extends outwardly so that it may be engaged by an upstanding flange 256 on the cycling slide 161. The tone arm return bracket 240 is provided with a transversely extending tone arm return lever 257, which is formed integrally with the end flange 242 and is provided with a pair of downturned ear portions 258 and 259 (FIG. 7) which are hingedly connected by means of the pin 260 to a pair of upstanding ear portions 261 and 262 on a tone arm indexing lever 263. Wtih this arrangement, the tone arm indexing lever 263 is mounted on and moves with the tone arm return lever 257. However, it will be noted that the indexing lever 263 is offset from the edge 265 (FIG. 5) of the tone arm return lever 257 and the upstanding flange 256 may strike the edge 265 without engaging the indexing lever 263 so that the lever 263 may be pivoted up and down for indexing purposes as will be described in more detail hereinafter.

Considering now the operation of the above described tone arm mounting arrangement, when the cycling slide 161 is moved forwardly during the first portion of the record changing cycle the elevating rod 238 is moved upwardly along the inclined flange 162 of the slide 161. Since the tone arm pivot bracket 226 is supported on the upper end of the elevating rod 238 the rear portion of the tone arm 52 also moves upwardly. However, the forward end of the tone arm is not moved off of the record until the tongue 248 engages the underside of the fan shaped portion 249. When the elevating rod 238 is moved completely up the inclined flange 162 the tongue 248 has engaged the underside of the fan portion 249 and the pivot pin 234 has been moved upwardly by an amount sufficient to lift the free end of the tone arm 52 off of the record which is uppermost on the stack. As the cycling slide 161 continues to move forwardly the upstanding flange 256 thereon engages the edge 266 (FIG. 9) of the tone arm lever 255 and moves this lever forwardly so that the tone arm mounting bracket 233, and hence the tone arm 52, is pivoted about the elevating rod 238 and the tone arm 52 is moved away from the spindle 56. As the cycling slide 161 continues to move forwardly the flange 256 also engages the edge 265 (FIG. 5) of the tone arm return lever 257 so that the levers 257 and 255 are brought into alignment. When the levers 255 and 257 are thus brought into alignment the tongue 248 moves into the notch 250 in the fan shaped portion 249 of the tone arm return bracket 240 due to the weight of the free end of the tone arm 52. After the tongue 248 is positioned within the notch 250 the brackets 233 and 240 are locked together so that they move as an integral unit and the tone arm may thereafter be positioned for different sized records by controlling the position of the indexing lever 263.

When the cycling slide 161 has been moved to its extreme forward position, i.e., the position shown in FIG. 5, the flange 256 has pivoted the tone arm 52 to its extreme outward position. As the cycling slide 161 is moved back to its rest position during the last half of the record changing cycle, a spring 267 which is connected between the base plate 50 and the tone arm return lever 257, functions to hold the lever 257 in engagement with the flange 256 so that the tone arm 52 is moved inwardly until the indexing lever 263 is engaged by the size indexing mechanism as will be described in more detail hereinafter. When the lever 263 is restrained, inward movement of the tone arm movement is ceased and as the elevating rod 238 moves back down the inclined flange 162 it causes the tone arm 52 to be lowered to the record on the turntable 51. As soon as the tone arm rests on the uppermost record on the turntable and the tongue portion 248 has moved out of engagement with the notch 250, the tone arm 52 is free to follow the run-in groove of the record even though the record changing cycle is not completed. Accordingly, the tone arm is not held after the needle engages the record so that the stylus is not twisted and the tone arm does not tend to jump or skid when released due to spring tension of a twisted stylus. It will also be noted that the tone arm 52 is released from the indexing mechanism independently of the number of records on the turntable. Thus, if a large number of records are positioned on the turntable 51, the elevating rod 238 has only to move a short distance down the flange 162 before the tongue 248 is disengaged from the notch 249 and the tone arm 52 is released. On the other hand if a single record is positioned on the turntable 51, the elevating rod 238 is moved substantially completely down the incline 162 before the tone arm comes to rest on the record and is released from the indexing mechanism.

In order to provide an adjustment for the sit-down position of the tone arm 52 so that the tone arm may be adjusted to engage the run-in groove of the record, the tone arm pivot bracket 226 is provided with a downwardly extending flange 270 (FIG. 9) and the tone arm body 225 is provided with a flange 271 (FIG. 7) through which is threaded a screw 272 which engages the side of the flange 270. A spring 273 is connected between the flange 270 and a projection 274 on the inside of the tone arm body 225 so that the end of the screw 272 is biased against the flange 270. By adjustment of the screw 272 the position of the free end of the tone arm 52 may be adjusted relative to the tone arm mounting bracket 233 on which it is pivotally supported so that the sit-down position for the run-in groove may be adjusted. It will be noted that with the above described tone arm mounting arrangement the tone arm 52 may be held during the record changing cycle without jamming the cycling mechanism or causing damage to the tone arm mounting mechanism since the tone arm is pivotally connected to the pivot bracket 226 by means of the pivot pin 227 and these members may be moved relative to one another aaginst the force of the biasing sping 273.

While there have been described what are at present considered to be the preferred embodiments of the invention, it will be understood that various modifications may be made therein which are within the true spirit and scope of the invention as defined in the appended claims.

I claim:

1. In a record changer, a rotatable turntable for supporting records to be played, a centering spindle at the axis of said turntable, means for supporting a stack of records to be played on said spindle in non-playing position above said turntable, a tone arm positioned adjacent said turntable, means for moving said tone arm upwardly and outwardly beyond the edge of the record stack, means for successively releasing individual records of the stack to the turntable during successive record changing cycles, means positively interlocked with said tone arm for moving said tone arm inwardly to a predetermined indexing position means for lowering said tone arm into engagement with the top record on said turntable while said last named means remains positively interlocked with said tone arm to prevent further inward movement of said tone arm beyond said indexing position, and means for releasing said interconnected means from said tone arm in response to engagement of said tone arm with the top record to permit said tone arm to follow the groove of the top record on said turntable, said release of said positively interlocked means occurring at different times in the record changing cycle depending upon the height of the stack of records then deposited on said turntable.

2. In a record changer, a rotatable turntable for supporting records to be played, a centering spindle at the axis of said turntable, means for supporting a stack of records to be played on said spindle in non-playing position above said turntable, a tone arm positioned adjacent said turntable, means for moving said tone arm upwardly and outwardly beyond the edge of the record stack, means for successively releasing individual records of the stack to the turntable during successive record changing cycles, means for moving said tone arm inwardly toward the center of said turntable, means including an indexing member interconnected with said tone arm for positively preventing inward movement of said tone arm beyond a point above the lead-in groove of the top record on said turntable, means for lowering said tone arm onto the top record while said indexing member remains interconnected with said tone arm, and means for releasing said tone arm from said indexing member to permit the same to follow the lead-in groove of the top record, said releasing means being operative in correlation with the height of the record stack on said turntable so that said tone arm is released to follow the lead-in groove in response to engagement thereof with the top record and at a time within the record changing cycle which varies in accordance with the number of records already deposited on said turntable.

3. In a record changer, a rotatable turntable for supporting records to be played, a centering spindle at the axis of said turntable, means for supporting a stack of records to be played on said spindle in non-playing position above said turntable, a tone arm positioned adjacent said turntable, means for moving said tone arm upwardly and outwardly beyond the edge of the record stack, means for successively releasing individual records of the stack to the turntable during successive record changing cycles, a tone arm indexing member, means for interlocking said indexing member with said tone arm during said outward movement, means for moving said tone arm inwardly toward the center of said turntable, stop means movable into the path of said indexing member to terminate inward movement of said tone arm at a point above the lead-in groove of the uppermost record on said turntable, means for lowering said tone arm into engagement with the uppermost record on said table while said stop means engages said indexing member, and means operative upon engagement of said tone arm with the uppermost record on said turntable to release said interlocking means, whereby said tone arm is free to follow the lead-in groove of the uppermost record upon engagement therewith and irrespective of the number of records stacked on said turntable.

4. In an automatic record changer of the type provided with a rotatable turntable, a tone arm pivotally mounted beyond the edge of said turntable and record changing means for successively releasing records supported in a stack above said turntable onto said turntable during successive record changing cycles and including a cycling member movable over a predetermined path during each record changing cycle, a tone arm mounting mechanism comprising a supporting structure, a vertically extending post mounted on said supporting structure, a tone arm mounting assembly rotatably positioned on said post and including a transverse pivot pin which rests on the upper end of said post and supports said assembly for rotation about said post while permitting the tone arm to move about the axis of said pivot pin, means responsive to movement of said cycling member during the record changing cycle for moving said tone arm upwardly and outwardly beyond the edge of the record stack, a tone arm indexing member rotatably mounted on said post, means for interlocking said indexing member with said tone arm mounting assembly, means responsive to movement of said cycling member for moving said tone arm inwardly toward the center of said turntable, stop means for limiting inward movement of said tone arm at a point above the lead-in groove of the uppermost record on said turntable, means for lowering said tone arm into engagement with the uppermost record on said turntable, and means operative upon engagement of said tone arm with the uppermost record on said turntable to release said tone arm mounting assembly from said tone arm indexing member so that said tone arm is free to follow the lead-in groove of the uppermost record even though the uppermost record is engaged substantially before the end of the record changing cycle.

5. In a record changer, a rotatable turntable for supporting records to be played, means for supporting a stack of records above said turntable and successively releasing individual records of the stack to the turntable during successive record changing cycles, a tone arm having a stylus adapted to engage a record on said turntable, a vertically extending post adjacent said turntable, means including a transversely extending pin resting on the top of said post for pivotally mounting said tone arm for vertical movement about the axis of said pin, a U-shaped bracket rotatably mounted on said post and having an upper leg positioned adjacent said tone arm, means defining a depending flange on said tone arm and positioned beyond said pin in the direction away from said turntable, means for producing relative movement between said tone arm and said bracket to lift said tone arm off of a record positioned on said turntable and interlock said flange with said upper leg, means for positioning said bracket so that said stylus is above the lead-in groove of the top record on said turntable while said flange and upper leg remain interlocked, and means for lowering said tone arm into engagement with the top record, said flange being disconnected from said upper leg as soon as the stylus engages the top record and in dependence upon the height of the stack of records then deposited on said turntable.

6. In a record changer, a rotatable turntable for supporting records to be played, means for supporting a stack of records above said turntable and successively releasing individual records of the stack to the turntable during successive record changing cycles, a tone arm having a stylus adapted to engage a record on said turntable, a vertically extending post adjacent said turntable, means including a transversely extending pin for pivotally mounting said tone arm for vertical movement about the axis of said pin, a bracket rotatably mounted on said post, means for producing relative movement between said tone arm and said bracket to lift said tone arm off of a record positioned on said turntable and interlock said tone arm with said bracket, means for positioning said bracket so that said stylus is above the lead-in groove of the top record on said turntable while said tone arm and bracket remain interlocked, and means for lowering said tone arm into engagement with the top record, said tone arm being disconnected from said bracket as soon as the stylus engages the top record and in dependence upon the height of the stack of records then deposited on said turntable.

References Cited

UNITED STATES PATENTS

| | | | |
|---|---|---|---|
| 2,488,260 | 11/1949 | Ascoli | 274—10 X |
| 2,803,465 | 8/1957 | Dobrogowski et al. | 274—23 X |
| 2,818,263 | 12/1957 | Dale | 274—10 |
| 2,868,547 | 1/1959 | Vistain | 274—15 |

NORTON ANSHER, Primary Examiner.

J. F. PETERS, Assistant Examiner.

UNITED STATES PATENT OFFICE
CERTIFICATE OF CORRECTION

Patent No. 3,332,689            July 25, 1967

James T. Dennis

It is hereby certified that error appears in the above numbered patent requiring correction and that the said Letters Patent should read as corrected below.

Column 4, line 16, for "those" read -- these --; column 12, line 62, after "position" insert a comma.

Signed and sealed this 24th day of September 1968.

(SEAL)
Attest:

Edward M. Fletcher, Jr.
Attesting Officer

EDWARD J. BRENNER
Commissioner of Patents